United States Patent
Guo et al.

(10) Patent No.: US 10,343,881 B2
(45) Date of Patent: Jul. 9, 2019

(54) AUTOMATIC BATCH PICKING ROBOT

(71) Applicants: Ching Qing Guo, Bellevue, WA (US);
ViVien Zhang Shao Guo, Bellevue, WA (US); Tiffany Tong Zhang, Bellevue, WA (US)

(72) Inventors: Ching Qing Guo, Bellevue, WA (US);
ViVien Zhang Shao Guo, Bellevue, WA (US); Tiffany Tong Zhang, Bellevue, WA (US)

( * ) Notice: Subject to any disclaimer, the term of this patent is extended or adjusted under 35 U.S.C. 154(b) by 0 days.

(21) Appl. No.: 15/959,198

(22) Filed: Apr. 21, 2018

(65) Prior Publication Data
US 2018/0305124 A1    Oct. 25, 2018

Related U.S. Application Data

(63) Continuation-in-part of application No. 15/928,080, filed on Mar. 21, 2018.

(60) Provisional application No. 62/503,328, filed on May 9, 2017, provisional application No. 62/489,408, filed on Apr. 24, 2017.

(51) Int. Cl.
| | |
|---|---|
| B25J 9/04 | (2006.01) |
| B66F 9/06 | (2006.01) |
| B65G 1/04 | (2006.01) |
| B65G 1/137 | (2006.01) |
| B65G 1/10 | (2006.01) |
| B25J 5/00 | (2006.01) |
| G05B 19/418 | (2006.01) |
| B25J 18/04 | (2006.01) |
| B25J 19/00 | (2006.01) |

(52) U.S. Cl.
CPC .............. *B66F 9/063* (2013.01); *B25J 5/007* (2013.01); *B25J 9/047* (2013.01); *B25J 18/04* (2013.01); *B25J 19/002* (2013.01); *B65G 1/0492* (2013.01); *B65G 1/10* (2013.01); *B65G 1/137* (2013.01); *B65G 1/1375* (2013.01); *B66F 9/06* (2013.01); *G05B 19/41895* (2013.01); *B65G 2209/06* (2013.01); *G05B 2219/31313* (2013.01); *G05D 2201/0216* (2013.01); *Y02P 90/02* (2015.11)

(58) Field of Classification Search
CPC .............. B25J 5/007; B66F 9/06; B66F 9/063
See application file for complete search history.

(56) References Cited

U.S. PATENT DOCUMENTS

| | | | |
|---|---|---|---|
| 4,698,775 A * | 10/1987 | Koch ..................... | B25J 5/007 414/265 |
| 9,519,284 B2 | 12/2016 | Wurman et al. | |
| 9,720,414 B1 * | 8/2017 | Theobald ............... | G06Q 50/14 |
| 2013/0310982 A1 * | 11/2013 | Scheurer ................ | B25J 9/1664 700/263 |
| 2014/0100690 A1 | 4/2014 | Wurman et al. | |

(Continued)

*Primary Examiner* — Thomas Randazzo
(74) *Attorney, Agent, or Firm* — Chen-Chi Lin

(57) ABSTRACT

A robotic system has a vehicle, a robot, a first removable rack and a second removable rack. The robot, the first removable rack and the second removable rack are mounted on a platform of the vehicle. A plurality of latches are used to lock or unlock the first removable rack and the second removable rack. The robot comprises a rotatable base. A method uses the robotic system to move a plurality of items from a stationary rack to a designated location.

20 Claims, 7 Drawing Sheets

(56) References Cited

U.S. PATENT DOCUMENTS

| | | | |
|---|---|---|---|
| 2015/0032252 A1* | 1/2015 | Galluzzo | B25J 5/007 |
| | | | 700/218 |
| 2015/0073589 A1* | 3/2015 | Khodl | B25J 5/007 |
| | | | 700/218 |
| 2016/0176638 A1* | 6/2016 | Toebes | G06Q 10/087 |
| | | | 700/216 |
| 2017/0107055 A1* | 4/2017 | Magens | G05D 1/021 |
| 2017/0183159 A1* | 6/2017 | Weiss | B65G 1/1378 |
| 2018/0022548 A1* | 1/2018 | Mattern | B65G 1/0492 |
| | | | 414/279 |
| 2018/0065258 A1* | 3/2018 | Liu | B25J 5/007 |
| 2018/0096299 A1 | 4/2018 | Jarvis et al. | |
| 2018/0104829 A1* | 4/2018 | Altman | B25J 19/005 |
| 2018/0127212 A1* | 5/2018 | Jarvis | B65G 1/0435 |
| 2018/0208398 A1* | 7/2018 | Haveman | B66F 9/0755 |

* cited by examiner

AUTOMATIC BATCH PICKING ROBOT

CROSS-REFERENCE TO RELATED APPLICATIONS

This Patent Application claims benefit of a Provisional Patent Application 62/503,328 filed on May 9, 2017. The Disclosure made in the Provisional Patent Application 62/503,328 is hereby incorporated by reference. This Patent is a Continuation-in-Part Application of a Non-provisional patent application Ser. No. 15/928,080 filed on Mar. 21, 2018. The Disclosure made in the Non-Provisional patent application Ser. No. 15/928,080 is hereby incorporated by reference. Furthermore, the disclosure made in the patent application Ser. No. 14/095,751 to Wurman; Peter R., et al., published as US Patent Application Publication 2014/0100690 and U.S. Pat. No. 9,519,284 is hereby incorporated by reference.

FIELD OF THE INVENTION

This invention relates generally to a robotic system. More particularly, the present invention relates to an automatic batch picking robot and a method of using the same.

BACKGROUND OF THE INVENTION

U.S. Pat. No. 9,519,284 to Wurman et al. discloses "goods to man" approach. It takes an entire rack, with tens of inventories, to pickers or a picking location. This approach carries empties spaces in the rack and only uses a fraction of the inventories spaces in the rack. On the contrary, the present disclosure only takes inventory from racks as needed. The present disclosure is more efficient.

The present disclosure supports batch processing to create an entirely related buffer for needed items to dramatically improve picking and sorting efficiency. The present disclosure enables mechanisms for using "vision, magnets, or lasers for navigation" including applying optical sensors, sensing QR codes, applying magnets from wires and applying laser from laser bouncing.

The present disclosure facilitates three-dimensional navigation to locate addresses of bins or pallets on racks, on lockers or designated spaces on a floor. Bins and pallets may have bottom portions in letter M shapes or in character π shapes.

SUMMARY OF THE INVENTION

A fork-shaped lifter mounted on a vehicle is different from a conventional automatically guided vehicle (AGV). The vehicle moves in a horizontal direction. A base of the fork-shaped lifter rotates. The base has slots to allow poles of the fork-shaped lifter to translate along the slots.

A robotic system has a vehicle, a robot, a first removable rack and a second removable rack. The robot, the first removable rack and the second removable rack are mounted on a platform of the vehicle. A plurality of latches are used to lock or unlock the first removable rack and the second removable rack. The robot comprises a rotatable base. A method uses the robotic system to move a plurality of items from a stationary rack to a designated location.

The robotic system of the present disclosure is designed to automatically pick or automatically load items from one location to another. The robotic system may include a manipulator or a fork-shaped lifter. Temporary storage areas are available on the vehicle to support batch processing. The robotic system may be built with different sizes and different strength to move goods of different sizes and different weights.

DETAILED DESCRIPTION OF THE INVENTION

Figure 1:
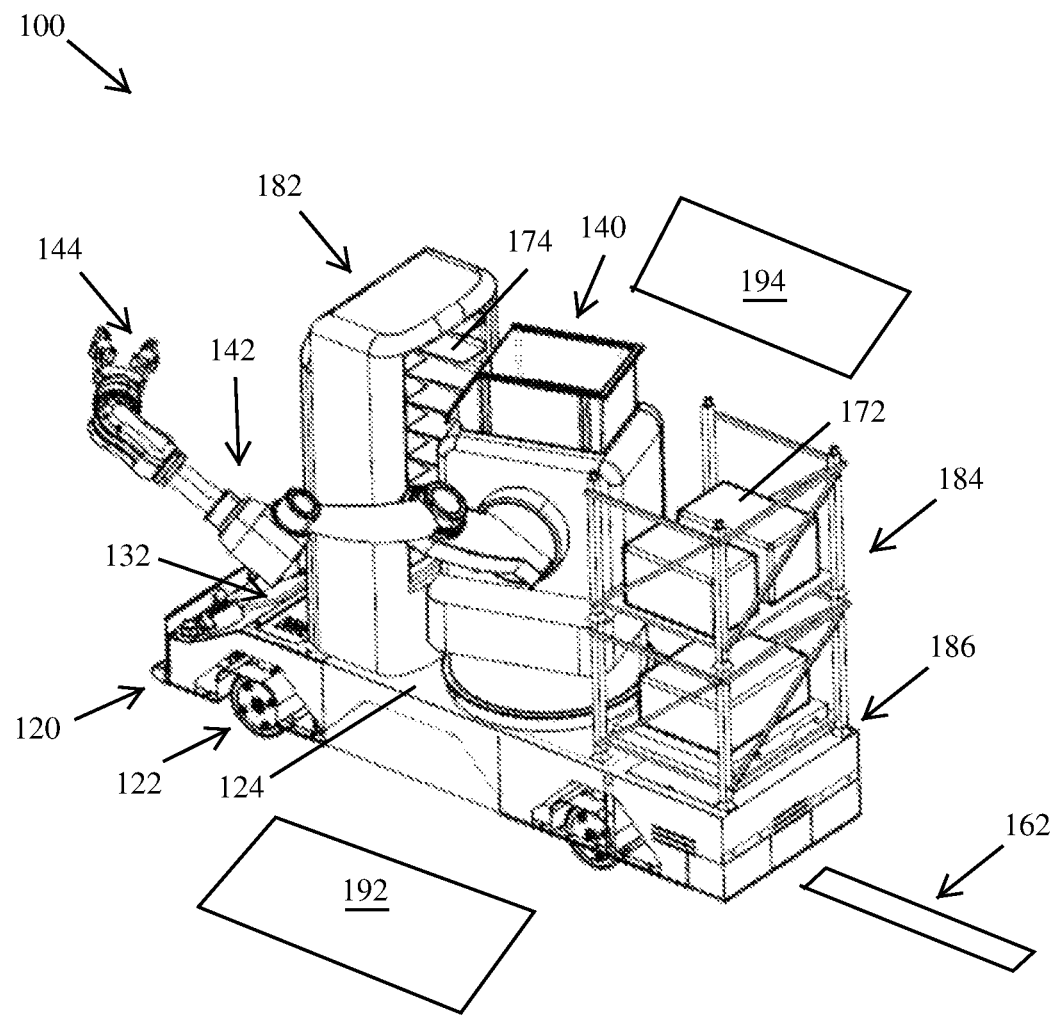
FIG. 1 is a perspective view of a robotic system in examples of the present disclosure.

FIG. 1 is a perspective view of a robotic system 100 in examples of the present disclosure. The robotic system 100 has a vehicle 120, a robot 140, a first removable rack 182 and a second removable rack 184. The vehicle 120 has a plurality of wheels 122, a driving assembly 132 and a platform 124. The robot 140, the first removable rack 182 and the second removable rack 184 are mounted on the platform 124 of the vehicle 120.

In one example, the driving assembly 132 is an engine. In another example, the driving assembly 132 is a battery. The first removable rack 182 is closer to the driving assembly 132 than the second removable rack 184. The robot 140 is between the first removable rack 182 and the second removable rack 184. In examples of the present disclosure, a plurality of latches 186 are used to lock or unlock the second removable rack 184.

In examples of the present disclosure, the robot 140 is a manipulator comprising an arm 142 having a gripper 144. The gripper 144 of the arm 142 is configured to grab a bin 172, a pallet 174, the first removable rack 182 or the second removable rack 184.

In examples of the present disclosure, the robot 140 picks up the first removable rack 182 and then places the first removable rack 182 on a first designated space 192. In examples of the present disclosure, the robot 140 unlocks the plurality of latches 186, then the robot 140 picks up the second removable rack 184 and then places the second removable rack 184 on a second designated space 194.

In examples of the present disclosure, the vehicle 120 is a driverless vehicle and the vehicle moves along a plurality of guiding tracks 162 on a floor.

Figure 2:
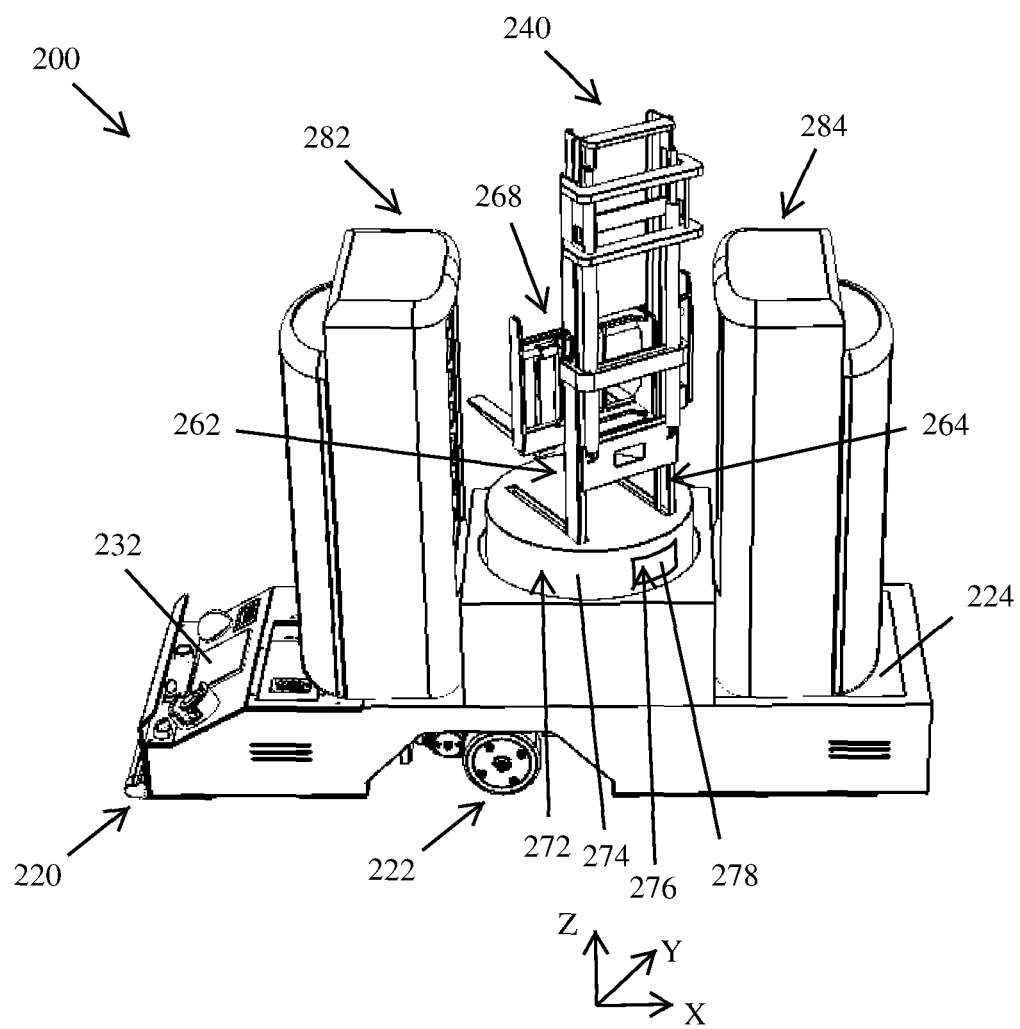
FIG. 2 is a perspective view of another robotic system in examples of the present disclosure.

FIG. 2 is a perspective view of a robotic system 200 in examples of the present disclosure. The robotic system 200 has a vehicle 220, a robot (a fork-shaped lifter 240), a first removable rack 282 and a second removable rack 284. The vehicle 220 has a plurality of wheels 222, a driving assembly 232 and a platform 224. The fork-shaped lifter 240, the first removable rack 282 and the second removable rack 284 are mounted on the platform 224 of the vehicle 220.

In one example, the driving assembly 232 is an engine. In another example, the driving assembly 232 is a battery. The first removable rack 282 is closer to the driving assembly 232 than the second removable rack 284. The fork-shaped lifter 240 is between the first removable rack 282 and the second removable rack 284.

Figure 3:
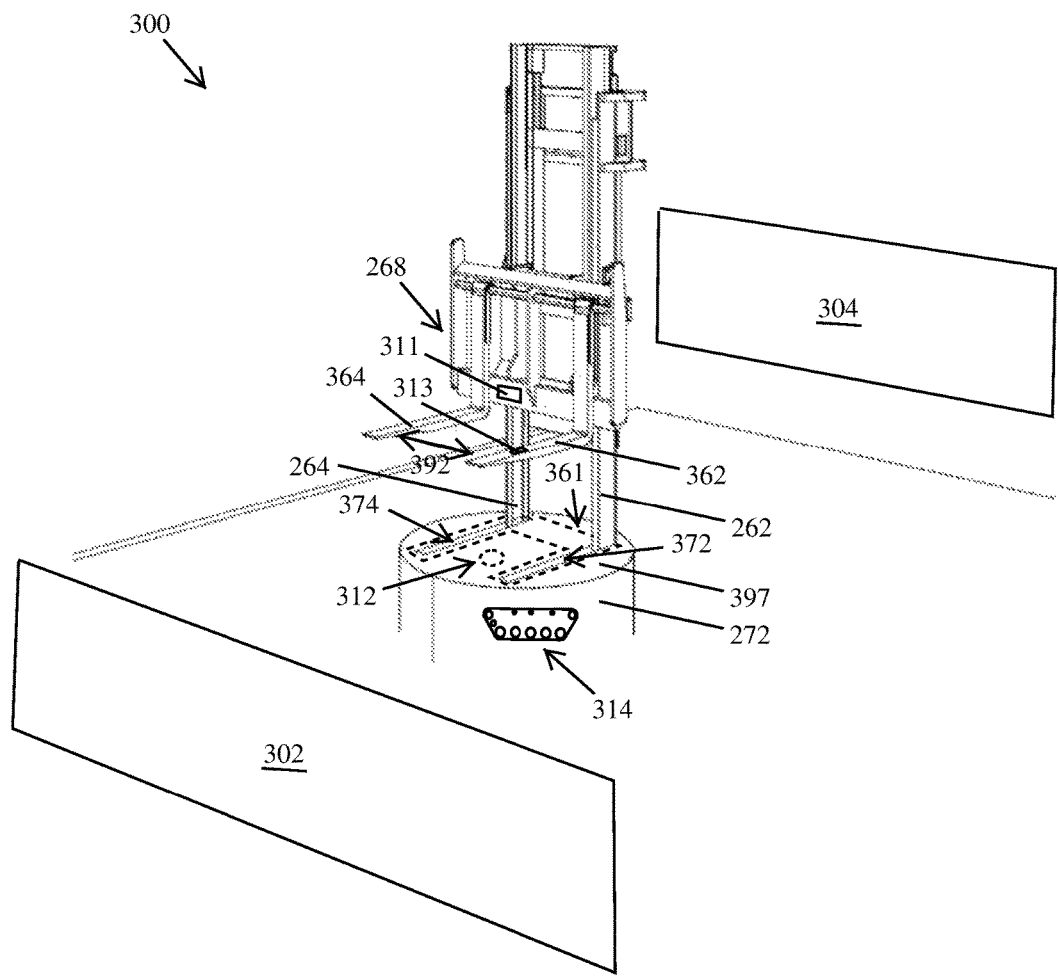
FIG. 3 is a perspective view of a fork-shaped lifter in examples of the present disclosure.

In examples of the present disclosure, the fork-shaped lifter 240 is a fork-shaped lifter comprising a base 272, a first pole 262, a second pole 264, a frame 268, a first fork prong 362 of FIG. 3 and a second fork prong 364 of FIG. 3. The base 272 is rotatable about the Z-axis. The base 272 comprises a first slot 372 of FIG. 3 and a second slot 374 of FIG. 3. The second slot 374 of FIG. 3 is parallel to the first slot 372 of FIG. 3. The first slot 372 of FIG. 3 is on the XY plane and is perpendicular to the Z-axis.

In examples of the present disclosure, the fork-shaped lifter 240 is characterized by a first condition, a second condition, a third condition and a fourth condition. In the first condition, a front side of the fork-shaped lifter 240 faces the first removable rack 282. In the second condition, the base 272 rotates 90 degrees from the first condition so that the front side of the fork-shaped lifter 240 faces a first stationary rack 302 of FIG. 3 or a first designated space 192 of FIG. 1. In the third condition, the base 272 rotates 180 degrees from the first condition so that the front side of the fork-shaped lifter 240 faces the second removable rack 284. In the fourth condition, the base 272 rotates 270 degrees from the first condition so that the front side of the fork-shaped lifter 240 faces a second stationary rack 304 of FIG. 3 or a second designated space 194 of FIG. 1.

In examples of the present disclosure, the fork-shaped lifter 240 picks up the first removable rack 282 and then places the first removable rack 282 on a first designated space 192 of FIG. 1. In examples of the present disclosure, the fork-shaped lifter 240 picks up the second removable rack 284 and then places the second removable rack 284 on a second designated space 194 of FIG. 1.

In examples of the present disclosure, the vehicle 220 is a driverless vehicle and the vehicle moves along a plurality of guiding tracks 162 of FIG. 1 on a floor.

FIG. 3 is a perspective view of a fork-shaped lifter 300 in examples of the present disclosure. The fork-shaped lifter 300 comprises a base 272, a first pole 262, a second pole 264, a frame 268, a first fork prong 362 and a second fork prong 364. The base 272 comprises a first slot 372 and a second slot 374. The first pole 262 translates along the first slot 372. The second pole 264 translates along the second slot 374. The frame 268 translates along the Z-axis of FIG. 2. The frame 268 is directly mounted on the first pole 262 and the second pole 264.

The first fork prong 362 is directly mounted on the frame 268. The second fork prong 364 is directly mounted on the frame 268. The second fork prong 364 is parallel to the first fork prong 362. A width 392 between the first fork prong 362 and the second fork prong 364 is adjustable.

In examples of the present disclosure, the base 272 is of a cylinder shape.

In examples of the present disclosure, the fork-shaped lifter 300 is characterized by a rest condition and an operational condition. In the rest condition, an entirety of a projected image 361 (shown in dashed lines) of the fork-shaped lifter along the Z-axis of FIG. 2 onto a top surface 397 of the cylinder shape of the base 272 is contained within the top surface 397 of the cylinder shape of the base 272. Therefore, a tip of the first fork prong 362 will not interference with external stationary objects when the vehicle 220 of FIG. 2 moves along the plurality of guiding tracks 162 of FIG. 1. In the operational condition, a tip of the first fork prong 362 extends beyond a peripheral of the cylinder shape of the base 272 so that an entirety of another projected image of the fork-shaped lifter along the Z-axis of FIG. 2 onto a top surface 397 of the cylinder shape of the base 272 is not contained within the top surface 397 of the cylinder shape of the base 272. Therefore, the fork-shaped lifter 300 may take a bin 172 of FIG. 1 or a pallet 174 of FIG. 1 from a first stationary rack 302 or a second stationary rack 304.

In examples of the present disclosure, a motor assembly 312 drives a power chain 314 to move the first pole 262 along the first slot 372 and to move the second pole 264 along the second slot 374. In examples of the present disclosure, a motor assembly 312 rotates the base 272. In examples of the present disclosure, the power chain 314 is similar to a tank's chain for movement.

In examples of the present disclosure, the first fork prong 362 and the second fork prong 364 of the fork-shaped lifter 300 are configured to pick up the bin 172 of FIG. 1, the pallet 174 of FIG. 1, the first removable rack 182 of FIG. 1 or the second removable rack 184 of FIG. 1.

In examples of the present disclosure, the fork-shaped lifter 300 has a sensor assembly 311 to sense the identification number of the bin 172 of FIG. 1, the pallet 174 of FIG. 1, the first removable rack 182 of FIG. 1 or the second removable rack 184 of FIG. 1.

In examples of the present disclosure, the fork-shaped lifter 300 has a weight scale 313 to measure the weight of the bin 172 of FIG. 1, the pallet 174 of FIG. 1, the first removable rack 182 of FIG. 1 or the second removable rack 184 of FIG. 1.

Figure 4:
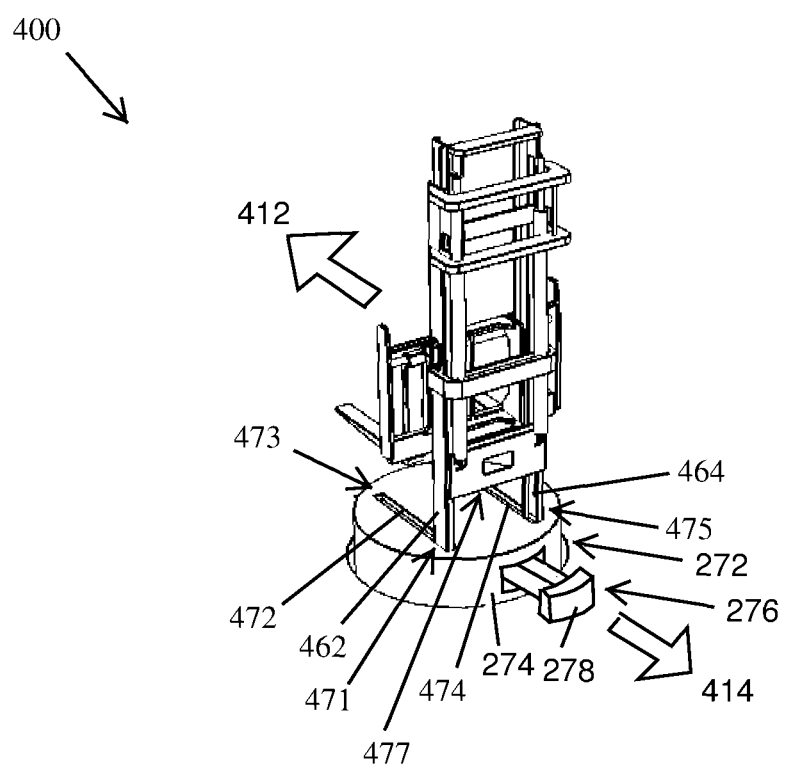
FIG. 4 is a perspective view of another fork-shaped lifter in examples of the present disclosure.

FIG. 4 is a perspective view of another fork-shaped lifter 400 in examples of the present disclosure. In examples of the present disclosure, the fork-shaped lifter 400 is characterized by a rest condition and an operational condition. In the rest condition, a first pole 462 is located at a proximal end 471 of the first slot 472 and a second pole 464 is located at a proximal end 475 of the second slot 474. In the operational condition, the first pole 462 is located at a distal end 473 of the first slot 472 and the second pole 464 is located at a distal end 477 of the second slot 474.

In examples of the present disclosure, in the rest condition, an outer surface 278 of the balance weight 276 is aligned with a side surface 274 of the base 272 (see FIG. 2). In examples of the present disclosure, in the operational condition, the balance weight 276 extends away from the side surface 274 of the base 272 by a distance along a direction 414 opposite a longitudinal direction 412 of the first fork prong. The outer surface 278 of the balance weight 276 has an offset from the side surface 274 of the base 272. In examples of the present disclosure, the distance of the balance weight 276 is proportional to the weight of the bin 172 of FIG. 1, the pallet 174 of FIG. 1, the first removable rack 182 of FIG. 1 or the second removable rack 184 of FIG. 1. In examples of the present disclosure, a centroid of the fork-shaped lifter 400 with a lifted item is directly above a center of a top surface of the base 272 along the Z-axis of FIG. 2 by adjusting a travel distance along the direction 414 of the balance weight 276. Therefore, stresses developed in a rotational shaft of the base 272 during rotation is reduced. In one example, a mass of the balance weight 276 is in a range from one Kg to ten Kg. In another example, a mass of the balance weight 276 is in a range from ten Kg to one-hundred Kg.

Figure 5:
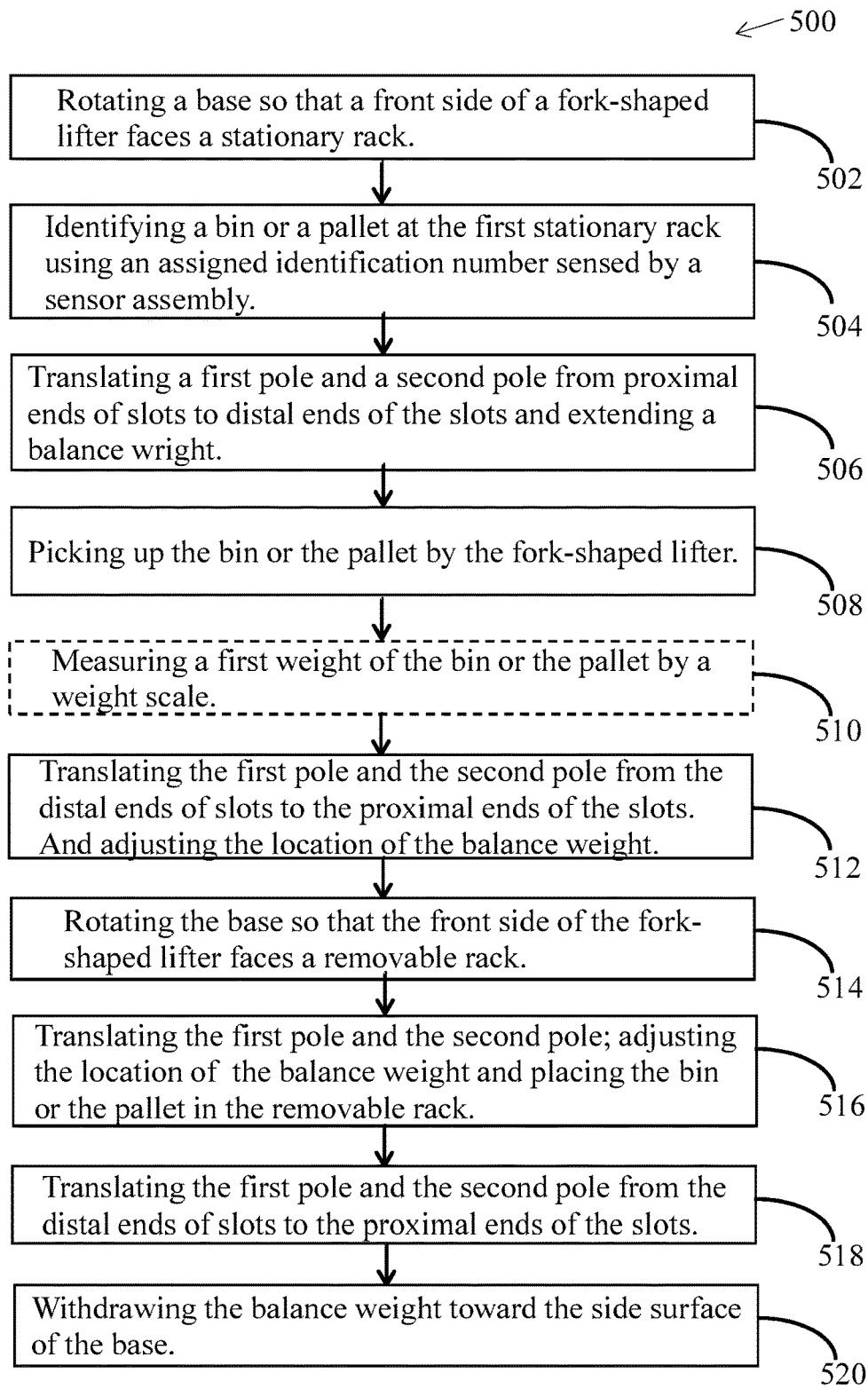
FIG. 5 is a flowchart of a method to move an item from a stationary rack to a removable rack in examples of the present disclosure.

FIG. 5 is a flowchart of a method 500 to move an item from a stationary rack to a removable rack in examples of the present disclosure. The method 500 may begin in block 502.

In block 502, a base 272 of FIG. 2 of the fork-shaped lifter 240 is rotated so that a front side of a fork-shaped lifter 240 faces a stationary rack 302 of FIG. 3. In one example, the front side of the fork-shaped lifter 240 originally faces the first removable rack 282 and then the base 272 rotates by 90 degrees so that the front side of the fork-shaped lifter 240 faces the first stationary rack 302 of FIG. 3. The stationary rack 302 of FIG. 3 is external to the robotic system 200. The stationary rack 302 of FIG. 3 does not move with the vehicle 220. Block 502 may be followed by block 504.

In block 504, a first bin 172 of FIG. 1 or a first pallet 174 of FIG. 1 at the first stationary rack 302 of FIG. 3 is identified using an assigned identification number sensed by a sensor assembly 311 of FIG. 3. Block 504 may be followed by block 506.

In block 506, the fork-shaped lifter 240 of FIG. 2 moves along the direction 412 of FIG. 4. The first pole 462 of FIG. 4 translates from the proximal end 471 of the first slot 472 to the distal end 473 of the first slot 472 and the second pole 464 translates from the proximal end 475 of the second slot 474 to the distal end 477 of the second slot 474. The balance weight 276 extends away from the side surface 274 of the base 272 along the direction 414 of FIG. 4 to a predetermined distance. In one example, a weight of the first bin 172 of FIG. 1 or the first pallet 174 of FIG. 1 being previously measured and recorded, the predetermined distance of the balance weight 276 results in a centroid of the fork-shaped lifter 400 with the first bin 172 of FIG. 1 or the first pallet 174 of FIG. 1 being directly above a center of a top surface of the base 272 along the Z-axis of FIG. 2. In another example, a weight of the first bin 172 of FIG. 1 or the first pallet 174 of FIG. 1 not being previously measured and recorded, the predetermined distance is a fixed value (for example, fifty centimeters, one meter or two meters). Block 506 may be followed by block 508.

In block 508, the fork-shaped lifter 240 of FIG. 2 picks up the first bin 172 of FIG. 1 or the first pallet 174 of FIG. 1. Block 508 may be followed by block 510.

In block 510, a first weight of the first bin 172 of FIG. 1 or the first pallet 174 of FIG. 1 is measured by the weight scale 313 of FIG. 3. Block 510 is optional (shown in dashed lines). The weight of the first bin 172 of FIG. 1 or the first pallet 174 of FIG. 1 may be previously measured and recorded. Block 510 may be followed by block 512.

In block 512, the first pole 462 of FIG. 4 translates from the distal end 473 of the first slot 472 to the proximal end 471 of the first slot 472 and the second pole 464 translates from the distal end 477 of the second slot 474 to the proximal end 475 of the second slot 474. The location of the balance weight 276 is adjusted. The adjusted location of the balance weight 276 results in a centroid of the fork-shaped lifter 400 with the first bin 172 of FIG. 1 or the first pallet 174 of FIG. 1 being directly above a center of a top surface of the base 272 along the Z-axis of FIG. 2. Block 512 may be followed by block 514.

In block 514, the base 272 is rotated so that the front side of the fork-shaped lifter 240 of FIG. 2 faces a removable rack. In one example, the removable rack is the removable rack 282. In another example, the removable rack is the removable rack 284. Block 514 may be followed by block 516.

In block 516, the first pole 462 of FIG. 4 translates from the proximal end 471 of the first slot 472 to the distal end 473 of the first slot 472 and the second pole 464 translates from the proximal end 475 of the second slot 474 to the distal end 477 of the second slot 474. The location of the balance weight 276 is adjusted. The adjusted location of the balance weight 276 results in a centroid of the fork-shaped lifter 400 with the first bin 172 of FIG. 1 or the first pallet 174 of FIG. 1 being directly above a center of a top surface of the base 272 along the Z-axis of FIG. 2. The fork-shaped lifter 240 of FIG. 2 places the first bin 172 of FIG. 1 or the first pallet 174 of FIG. 1 in the removable rack. Block 516 may be followed by block 518.

In block 518, the first pole 462 of FIG. 4 translates from the distal end 473 of the first slot 472 to the proximal end 471 of the first slot 472 and the second pole 464 translates from the distal end 477 of the second slot 474 to the proximal end 475 of the second slot 474. Block 518 may be followed by block 520.

In block 520, the balance weight 276 withdraw toward the side surface 274 of the base 272 so that the outer surface 278 of the balance weight 276 is aligned with the side surface 274 of the base 272 (see FIG. 2).

Figure 6:
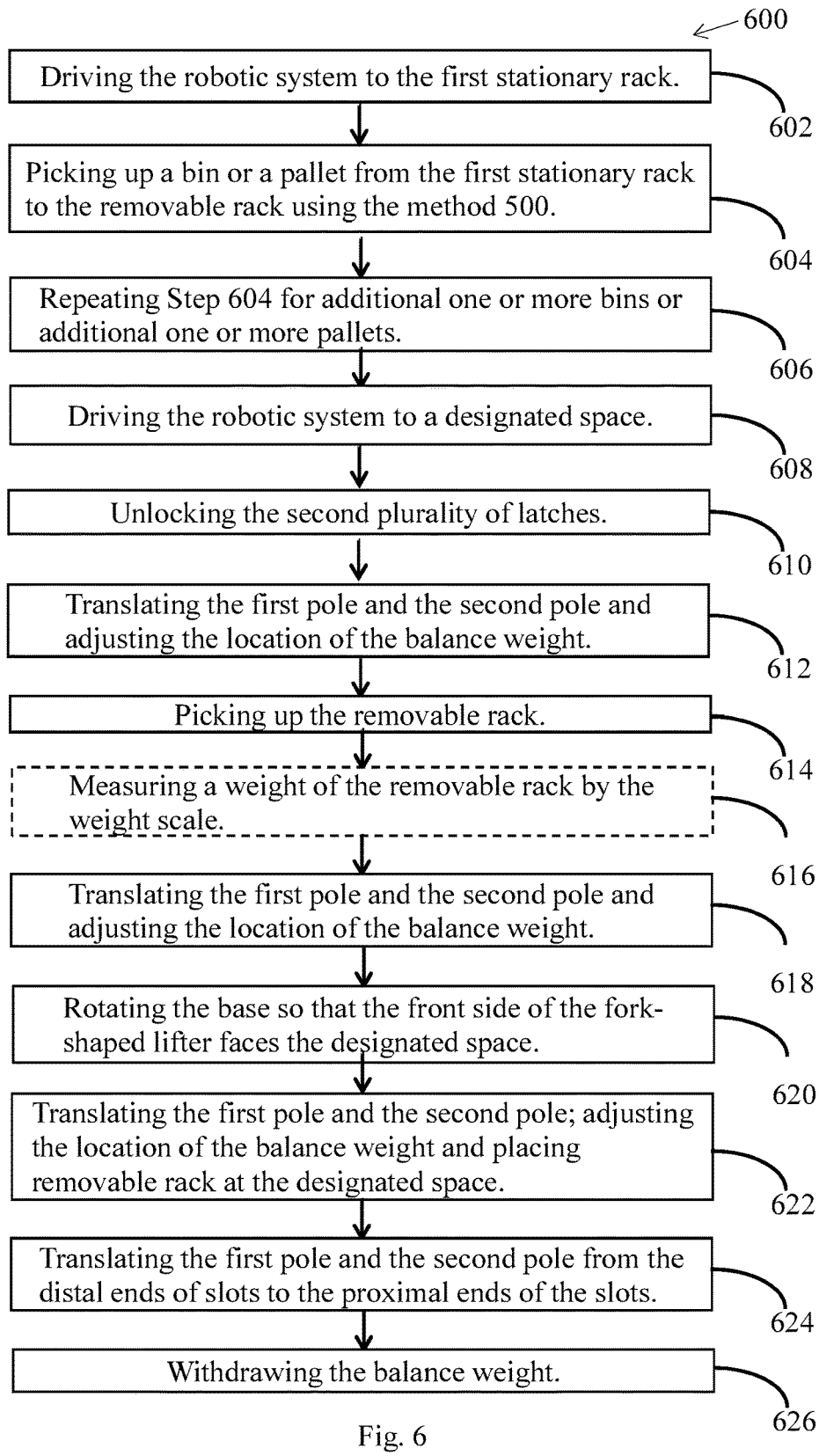
FIG. 6 is a flowchart of a method to move a plurality of items from a stationary rack to a designated location in examples of the present disclosure.

FIG. 6 is a flowchart of a method 600 to move a plurality of items from a stationary rack to a designated location in examples of the present disclosure. The picked and placed items may be sorted in method 600. The method 600 may begin in block 602.

In block 602, the robotic system 200 of FIG. 2 moves to the first stationary rack 302 of FIG. 3. Block 602 may be followed by block 604.

In block 604, the fork-shaped lifter 240 picks up a bin or a pallet from the first stationary rack 302 of FIG. 3 to the removable rack using the method 500. In one example, the removable rack is the removable rack 282. In another example, the removable rack is the removable rack 284. Block 604 may be followed by block 606.

In block 606, block 604 is repeated for additional one or more bins or additional one or more pallets. Block 606 may be followed by block 608.

In block 608, the robotic system 200 of FIG. 2 moves to a designated space 192 of FIG. 1. Block 608 may be followed by block 610.

In block 610, a plurality of latches of the removable rack are unlocked. Block 610 may be followed by block 612.

In block 612, the fork-shaped lifter 240 of FIG. 2 moves along the direction 412 of FIG. 4. The first pole 462 of FIG. 4 translates from the proximal end 471 of the first slot 472 to the distal end 473 of the first slot 472 and the second pole 464 translates from the proximal end 475 of the second slot 474 to the distal end 477 of the second slot 474. The adjusted location of the balance weight 276 results in a centroid of the fork-shaped lifter 400 with the removable rack containing bins or pallets being directly above a center of a top surface of the base 272 along the Z-axis of FIG. 2. Block 612 may be followed by block 614.

In block 614, the fork-shaped lifter 240 of FIG. 2 picks up the removable rack. Block 614 may be followed by block 616.

In block 616, a weight of the removable rack is measured by the weight scale 313 of FIG. 3. Block 616 is optional (shown in dashed lines). The weight of the removable rack containing bins and pallets can be calculated if the weight of the empty removable rack and the weights of the bins and pallets are previously measured and recorded. Block 616 may be followed by block 618.

In block 618, the first pole 462 of FIG. 4 translates from the distal end 473 of the first slot 472 to the proximal end 471 of the first slot 472 and the second pole 464 translates from the distal end 477 of the second slot 474 to the proximal end 475 of the second slot 474. The adjusted location of the balance weight 276 results in a centroid of the fork-shaped lifter 400 with the removable rack containing bins or pallets being directly above a center of a top surface of the base 272 along the Z-axis of FIG. 2. Block 618 may be followed by block 620.

In block 620, the base is rotated so that the front side of the fork-shaped lifter 240 of FIG. 2 faces the designated space 192 of FIG. 1. Block 620 may be followed by block 622.

In block 622, the first pole 462 of FIG. 4 translates from the proximal end 471 of the first slot 472 to the distal end 473 of the first slot 472 and the second pole 464 translates from the proximal end 475 of the second slot 474 to the distal end 477 of the second slot 474. The location of the balance weight 276 is adjusted. The adjusted location of the balance weight 276 results in a centroid of the fork-shaped lifter 400 with the removable rack containing bins or pallets being directly above a center of a top surface of the base 272 along the Z-axis of FIG. 2. The fork-shaped lifter 240 of FIG. 2 places the removable rack at the designated space. Block 622 may be followed by block 624.

In block 624, the first pole 462 of FIG. 4 translates from the distal end 473 of the first slot 472 to the proximal end 471 of the first slot 472 and the second pole 464 translates from the distal end 477 of the second slot 474 to the proximal end 475 of the second slot 474. Block 624 may be followed by block 626.

In block 626, the balance weight 276 withdraw toward the side surface 274 of the base 272 so that the outer surface 278 of the balance weight 276 is aligned with the side surface 274 of the base 272 (see FIG. 2).

Figure 7:
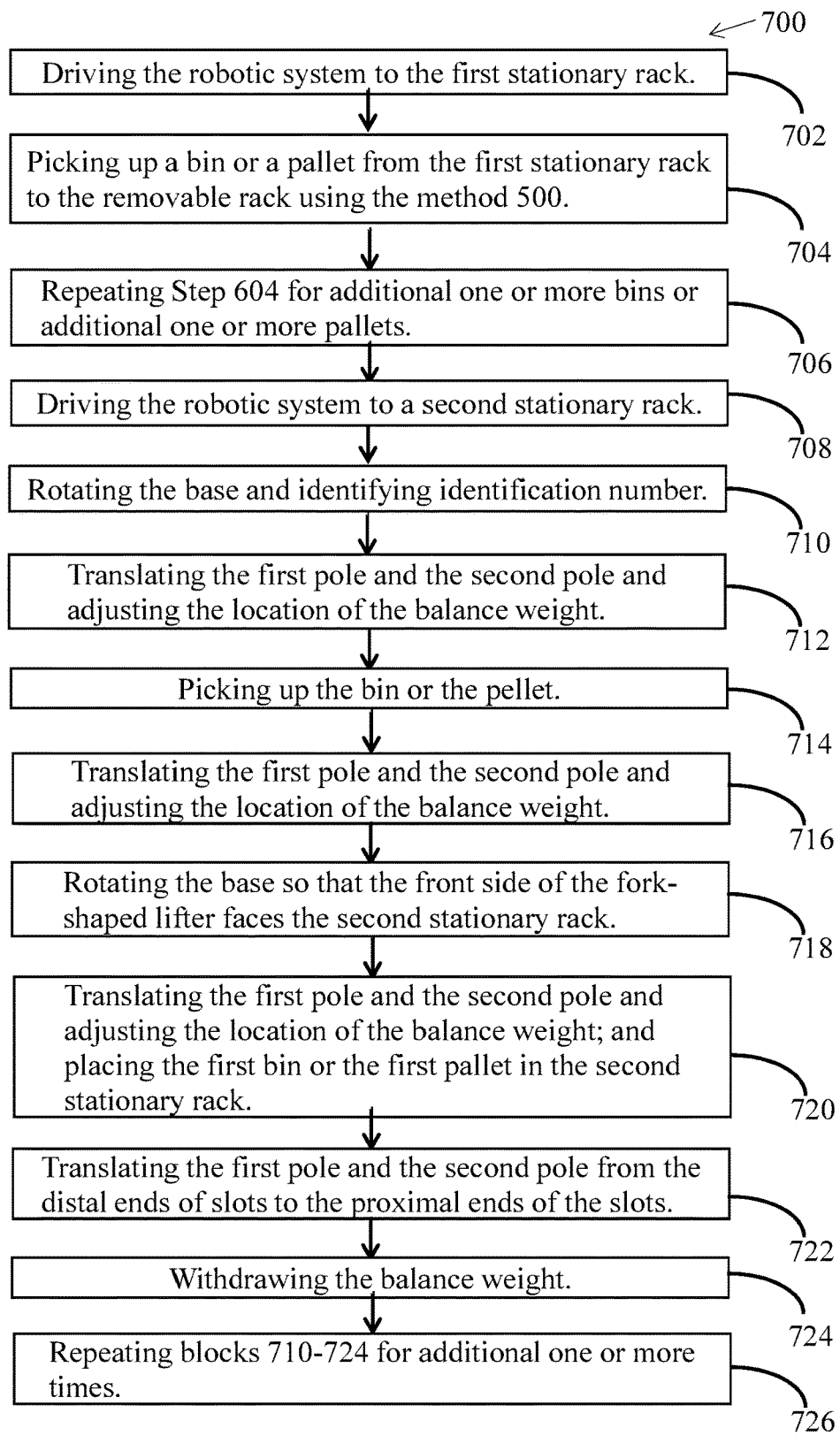
FIG. 7 is a flowchart of another method to move a plurality of items from a first stationary rack to a second stationary rack in examples of the present disclosure.

FIG. 7 is a flowchart of a method 700 to move a plurality of items from a first stationary rack to a second stationary rack in examples of the present disclosure. The method 700 may begin in block 702.

In block 702, the robotic system 200 of FIG. 2 moves to the first stationary rack 302 of FIG. 3. Block 702 may be followed by block 704.

In block 704, the fork-shaped lifter 240 picks up a bin or a pallet from the first stationary rack 302 of FIG. 3 to the removable rack using the method 500. In one example, the removable rack is the removable rack 282. In another example, the removable rack is the removable rack 284. Block 704 may be followed by block 706.

In block 706, block 704 is repeated for additional one or more bins or additional one or more pallets. Block 706 may be followed by block 708.

In block 708, the robotic system 200 of FIG. 2 moves to a second stationary rack 304 of FIG. 3. Block 708 may be followed by block 710.

In block 710, the base is rotated so that the front side of the fork-shaped lifter 240 of FIG. 2 faces the removable rack. A first bin or a first pallet at the removable rack is identified using an assigned identification number sensed by a sensor assembly 311 of FIG. 3. Block 710 may be followed by block 712.

In block 712, the fork-shaped lifter 240 of FIG. 2 moves along the direction 412 of FIG. 4. The first pole 462 of FIG. 4 translates from the proximal end 471 of the first slot 472 to the distal end 473 of the first slot 472 and the second pole 464 translates from the proximal end 475 of the second slot 474 to the distal end 477 of the second slot 474. The adjusted location of the balance weight 276 results in a centroid of the fork-shaped lifter 400 with the first bin or the first pallet being directly above a center of a top surface of the base 272 along the Z-axis of FIG. 2. Block 712 may be followed by block 714.

In block 714, the fork-shaped lifter 240 of FIG. 2 picks up the bin or the pallet. Block 714 may be followed by block 716.

In block 716, the first pole 462 of FIG. 4 translates from the distal end 473 of the first slot 472 to the proximal end 471 of the first slot 472 and the second pole 464 translates from the distal end 477 of the second slot 474 to the proximal end 475 of the second slot 474. The adjusted location of the balance weight 276 results in a centroid of the fork-shaped lifter 400 with the first bin or the first pallet being directly above a center of a top surface of the base 272 along the Z-axis of FIG. 2. Block 716 may be followed by block 718.

In block 718, the base is rotated so that the front side of the fork-shaped lifter 240 of FIG. 2 faces the second stationary rack 304 of FIG. 3. Block 718 may be followed by block 720.

In block 720, the first pole 462 of FIG. 4 translates from the proximal end 471 of the first slot 472 to the distal end 473 of the first slot 472 and the second pole 464 translates from the proximal end 475 of the second slot 474 to the distal end 477 of the second slot 474. The location of the balance weight 276 is adjusted. The adjusted location of the balance weight 276 results in a centroid of the fork-shaped lifter 400 with the first bin or the first pallet being directly above a center of a top surface of the base 272 along the Z-axis of FIG. 2. The fork-shaped lifter 240 of FIG. 2 places the bin or the pallet in the second stationary rack 304 of FIG. 3. Block 720 may be followed by block 722.

In block 722, the first pole 462 of FIG. 4 translates from the distal end 473 of the first slot 472 to the proximal end 471 of the first slot 472 and the second pole 464 translates from the distal end 477 of the second slot 474 to the proximal end 475 of the second slot 474. Block 722 may be followed by block 724.

In block 724, the balance weight 276 withdraw toward the side surface 274 of the base 272 so that the outer surface 278 of the balance weight 276 is aligned with the side surface 274 of the base 272 (see FIG. 2). Block 724 may be followed by block 726.

In block 726, blocks 710-724 are repeated for additional one or more times.

Those of ordinary skill in the art may recognize that modifications of the embodiments disclosed herein are possible. For example, a number of the pallets may vary. A number of the bins may vary. Other modifications may occur to those of ordinary skill in this art, and all such modifications are deemed to fall within the purview of the present invention, as defined by the claims.

The invention claimed is:
1. A robotic system comprising:
a vehicle comprising:
    a plurality of wheels;
    a driving assembly; and
    a platform;
a robot mounted on the platform of the vehicle; and
a first removable rack mounted on the platform of the vehicle; and
a second removable rack mounted on the platform of the vehicle;
wherein the driving assembly is an engine or a battery;
wherein the first removable rack is closer to the driving assembly than the second removable rack; and wherein the robot is between the first removable rack and the second removable rack.

2. The robotic system of claim 1, wherein the robot is a manipulator comprising an arm having a gripper and wherein the gripper of the arm is configured to grab a bin, a pallet, the first removable rack or the second removable rack.

3. The robotic system of claim 1, wherein the robot is a fork-shaped lifter comprising
- a base rotatable about a first direction, the base comprising a first slot and a second slot parallel to the first slot, the first slot being perpendicular to the first direction;
- a first pole translating along the first slot;
- a second pole translating along the second slot;
- a frame translating along the first direction, the frame being directly mounted on the first pole and the second pole;
- a first fork prong directly mounted on the frame; and
- a second fork prong directly mounted on the frame, the second fork prong being parallel to the first fork prong;
- wherein a width between the first fork prong and the second fork prong is adjustable.

4. The robotic system of claim 3, wherein the fork-shaped lifter is characterized by
- a rest condition in which
  - the first pole is located at a proximal end of the first slot; and
  - the second pole is located at a proximal end of the second slot; and
- an operational condition in which
  - the first pole is located at a distal end of the first slot; and
  - the second pole is located at a distal end of the second slot.

5. The robotic system of claim 4, wherein the base is of a cylinder shape.

6. The robotic system of claim 5, the fork-shaped lifter is characterized by
- the rest condition in which
  - an entirety of a projected image of the fork-shaped lifter along the first direction onto a top surface of the cylinder shape is contained within the top surface of the cylinder shape; and
- the operational condition in which
  - a tip of the first fork prong extends beyond a peripheral of the cylinder shape so that an entirety of another projected image of the fork-shaped lifter along the first direction onto the top surface of the cylinder shape is not contained within the top surface of the cylinder shape.

7. The robotic system of claim 6, wherein the fork-shaped lifter is further characterized by
- a first condition in which
  - a front side of the fork-shaped lifter faces the first removable rack;
- a second condition in which
  - the base rotates ninety degrees from the first condition so that the front side of the fork-shaped lifter faces a first stationary rack or a first designated space;
- a third condition in which
  - the base rotates one hundred and eighty degrees from the first condition so that the front side of the fork-shaped lifter faces the second removable rack; and
- a fourth condition in which
  - the base rotates two hundred and seventy degrees from the first condition so that the front side of the fork-shaped lifter faces a second stationary rack or a second designated space.

8. The robotic system of claim 7, wherein the base further comprises a balance weight and wherein the fork-shaped lifter is characterized by
- the rest condition in which
  - an outer surface of the balance weight is aligned with a side surface of the base; and
- the operational condition in which
  - the balance weight extends away from the side surface of the base by a distance along a direction opposite a longitudinal direction of the first fork prong.

9. The robotic system of claim 8, wherein the fork-shaped lifter further comprises a weight scale configured to measure a weight of a bin, a pallet, the first removable rack or the second removable rack; and
- wherein the fork-shaped lifter is characterized by the operational condition in which
  - the distance of the balance weight is proportional to the weight of the bin, the pallet, the first removable rack or the second removable rack.

10. The robotic system of claim 9 further comprising a first plurality of latches to lock or unlock the first removable rack and a second plurality of latches to lock or unlock the second removable rack.

11. The robotic system of claim 10 further comprising a sensor assembly configured to sense an identification number of the bin, the pallet, the first removable rack or the second removable rack.

12. The robotic system of claim 11, wherein the vehicle is a driverless vehicle and the vehicle moves along a plurality of guiding tracks on a floor.

13. A method of using the robotic system of claim 12, the method comprising the steps of
- driving the robotic system to the first stationary rack;
- rotating the base by ninety degrees from the first condition so that the front side of the fork-shaped lifter faces the first stationary rack;
- identifying a first bin or a first pallet at the first stationary rack using an assigned identification number sensed by the sensor assembly;
- translating the first pole from the proximal end of the first slot to the distal end of the first slot and translating the second pole from the proximal end of the second slot to the distal end of the second slot and extending the balance weight away from the side surface of the base at a predetermined location;
- picking up the first bin or the first pallet by the fork-shaped lifter;
- translating the first pole from the distal end of the first slot to the proximal end of the first slot and translating the second pole from the distal end of the second slot to the proximal end of the second slot and adjusting a location of the balance weight;
- rotating the base so that the front side of the fork-shaped lifter faces the second removable rack;
- translating the first pole from the proximal end of the first slot to the distal end of the first slot and translating the second pole from the proximal end of the second slot to the distal end of the second slot and adjusting the location of the balance weight;
- placing the first bin or the first pallet in the second removable rack by the fork-shaped lifter;
- translating the first pole from the distal end of the first slot to the proximal end of the first slot and translating the second pole from the distal end of the second slot to the proximal end of the second slot and withdrawing the balance weight so that the outer surface of the balance weight is aligned with the side surface of the base;

picking up and placing additional one or more bins or additional one or more pallets by the fork-shaped lifter, one by one, from the first stationary rack to the second removable rack;

driving the robotic system to the second designated space;

unlocking the second plurality of latches;

translating the first pole from the proximal end of the first slot to the distal end of the first slot and translating the second pole from the proximal end of the second slot to the distal end of the second slot and adjusting the location of the balance weight;

picking up the second removable rack by the fork-shaped lifter;

translating the first pole from the distal end of the first slot to the proximal end of the first slot and translating the second pole from the distal end of the second slot to the proximal end of the second slot and adjusting the location of the balance weight;

rotating the base so that the front side of the fork-shaped lifter faces the second designated space;

translating the first pole from the proximal end of the first slot to the distal end of the first slot and translating the second pole from the proximal end of the second slot to the distal end of the second slot and adjusting the location of the balance weight;

placing the second removable rack at the second designated space by the fork-shaped lifter;

translating the first pole from the distal end of the first slot to the proximal end of the first slot and translating the second pole from the distal end of the second slot to the proximal end of the second slot; and withdrawing the balance weight so that the outer surface of the balance weight is aligned with the side surface of the base.

14. A method of using the robotic system of claim 12, the method comprising the steps of driving the robotic system to the first stationary rack;

rotating the base by ninety degrees from the first condition so that the front side of the fork-shaped lifter faces the first stationary rack;

identifying a first bin or a first pallet at the first stationary rack using an assigned identification number sensed by the sensor assembly;

translating the first pole from the proximal end of the first slot to the distal end of the first slot and translating the second pole from the proximal end of the second slot to the distal end of the second slot and extending the balance weight away from the side surface of the base at a predetermined location;

picking up the first bin or the first pallet by the fork-shaped lifter;

translating the first pole from the distal end of the first slot to the proximal end of the first slot and translating the second pole from the distal end of the second slot to the proximal end of the second slot and adjusting a location of the balance weight;

rotating the base so that the front side of the fork-shaped lifter faces the second removable rack;

translating the first pole from the proximal end of the first slot to the distal end of the first slot and translating the second pole from the proximal end of the second slot to the distal end of the second slot and adjusting the location of the balance weight;

placing the first bin or the first pallet in the second removable rack by the fork-shaped lifter;

translating the first pole from the distal end of the first slot to the proximal end of the first slot and translating the second pole from the distal end of the second slot to the proximal end of the second slot and withdrawing the balance weight so that the outer surface of the balance weight is aligned with the side surface of the base;

picking up and placing additional one or more bins or additional one or more pallets by the fork-shaped lifter, one by one, from the first stationary rack to the second removable rack;

driving the robotic system to the second stationary rack;

rotating the base so that the front side of the fork-shaped lifter faces the second removable rack;

identifying the first bin or the first pallet at the second removable rack using the assigned identification number sensed by the sensor assembly;

translating the first pole from the proximal end of the first slot to the distal end of the first slot and translating the second pole from the proximal end of the second slot to the distal end of the second slot and adjusting the location of the balance weight;

picking up the first bin or the first pallet by the fork-shaped lifter;

translating the first pole from the distal end of the first slot to the proximal end of the first slot and translating the second pole from the distal end of the second slot to the proximal end of the second slot and adjusting the location of the balance weight;

rotating the base so that the front side of the fork-shaped lifter faces the second stationary rack;

translating the first pole from the proximal end of the first slot to the distal end of the first slot and translating the second pole from the proximal end of the second slot to the distal end of the second slot and adjusting the location of the balance weight;

placing the first bin or the first pallet in the second stationary rack by the fork-shaped lifter;

translating the first pole from the distal end of the first slot to the proximal end of the first slot and translating the second pole from the distal end of the second slot to the proximal end of the second slot and withdrawing the balance weight so that the outer surface of the balance weight is aligned with the side surface of the base; and picking up and placing the additional one or more bins or the additional one or more pallets by the fork-shaped lifter, one by one, from the second removable rack to the second stationary rack.

15. A robotic system comprising:
a vehicle comprising:
 a plurality of wheels;
 a driving assembly; and
 a platform;
a robot mounted on the platform of the vehicle; and
a first removable rack mounted on the platform of the vehicle;
wherein the driving assembly is an engine or a battery;
wherein the robot is a fork-shaped lifter comprising a base;
wherein the base further comprises a balance weight; and
wherein the fork-shaped lifter is characterized by
 an rest condition in which
  an outer surface of the balance weight is aligned with a side surface of the base; and
 an operational condition in which the balance weight extends away from the side surface of the base by a distance along a direction opposite a longitudinal direction of a first fork prong of the fork-shaped lifter.

16. A robotic system comprising:
a vehicle comprising:
  a plurality of wheels;
  a driving assembly; and
  a platform;
a robot mounted on the platform of the vehicle; and
a first removable rack mounted on the platform of the vehicle;
wherein the driving assembly is an engine or a battery; and
wherein the robot is a fork-shaped lifter comprising
  a base rotatable about a first direction, the base comprising a first slot and a second slot parallel to the first slot, the first slot being perpendicular to the first direction;
  a first pole translating along the first slot;
  a second pole translating along the second slot;
  a frame translating along the first direction, the frame being directly mounted on the first pole and the second pole;
  a first fork prong directly mounted on the frame; and
  a second fork prong directly mounted on the frame, the second fork prong being parallel to the first fork prong;
  wherein a width between the first fork prong and the second fork prong is adjustable.

17. The robotic system of claim 16, wherein the fork-shaped lifter is characterized by
  a rest condition in which
    the first pole is located at a proximal end of the first slot; and
    the second pole is located at a proximal end of the second slot; and
  an operational condition in which
    the first pole is located at a distal end of the first slot; and
    the second pole is located at a distal end of the second slot.

18. The robotic system of claim 16 further comprising a second removable rack mounted on the platform of the vehicle; wherein the base is of a cylinder shape.

19. The robotic system of claim 18, the fork-shaped lifter is characterized by
  a rest condition in which
    an entirety of a projected image of the fork-shaped lifter along the first direction onto a top surface of the cylinder shape is contained within the top surface of the cylinder shape; and
  an operational condition in which
    a tip of the first fork prong extends beyond a peripheral of the cylinder shape so that an entirety of another projected image of the fork-shaped lifter along the first direction onto the top surface of the cylinder shape is not contained within the top surface of the cylinder shape.

20. The robotic system of claim 19, wherein the fork-shaped lifter is further characterized by
  a first condition in which
    a front side of the fork-shaped lifter faces the first removable rack;
  a second condition in which
    the base rotates ninety degrees from the first condition so that the front side of the fork-shaped lifter faces a first stationary rack or a first designated space;
  a third condition in which
    the base rotates one hundred and eighty degrees from the first condition so that the front side of the fork-shaped lifter faces the second removable rack; and
  a fourth condition in which
    the base rotates two hundred and seventy degrees from the first condition so that the front side of the fork-shaped lifter faces a second stationary rack or a second designated space.

* * * * *